May 6, 1941.  A. I. KOIVU  2,241,308
GAFF HOOK
Filed July 10, 1940
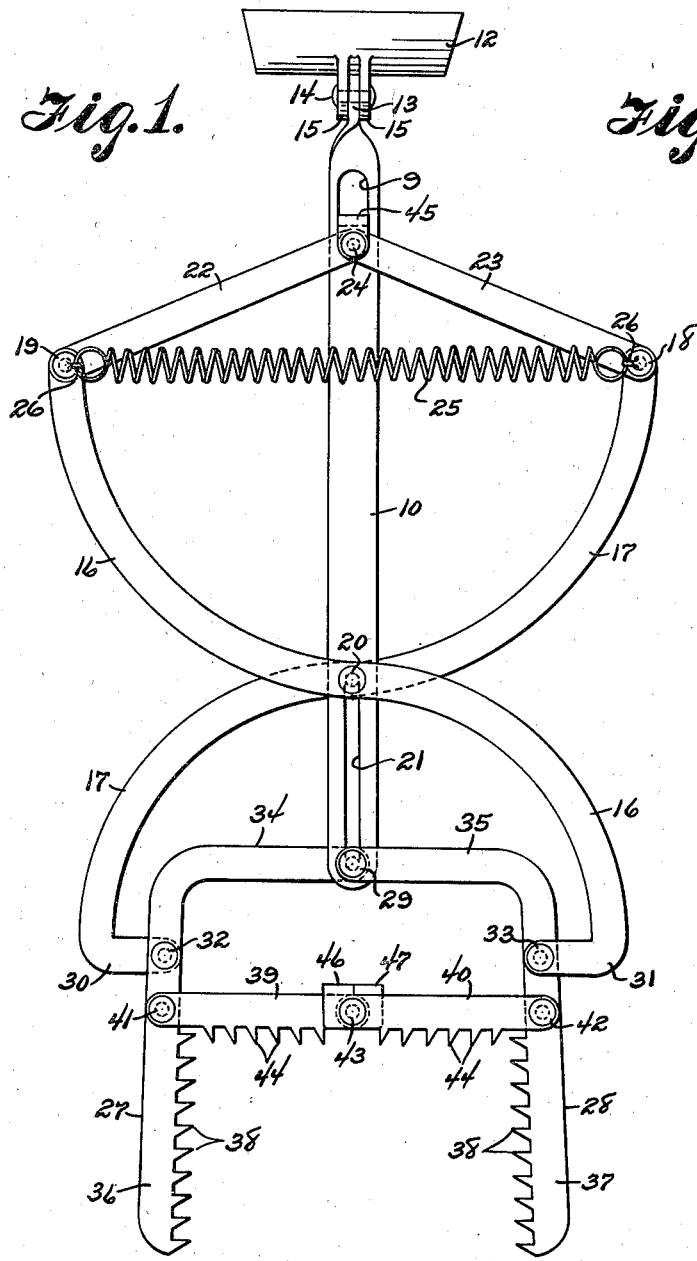
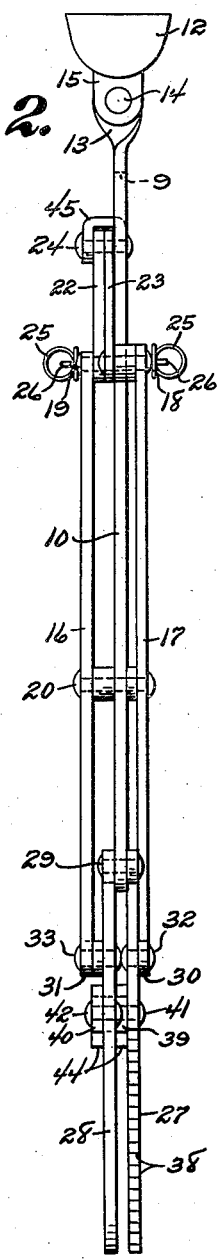
Arvo I. Koivu
INVENTOR
BY Victor J. Evans & Co.
ATTORNEYS Patented May 6, 1941

2,241,308

UNITED STATES PATENT OFFICE 2,241,308

GAFF HOOK

Arvo I. Koivu, Intola, Ontario, Canada

Application July 19, 1940, Serial No. 344,820

1 Claim. (Cl. 43—5)

This invention relates to a gaff hook and has for an object to provide a gaff hook having a trigger for holding the fish impaling jaws open, or set, against the tension of an operating spring, the trigger being formed of normally alined links pivotally connected together at their inner ends and pivotally connected at their outer ends to the jaws, the links being adapted to be dislodged upwardly at their pivoted inner ends by impact with a fish to permit the spring to automatically close the jaws upon the fish.

Another object is to provide a gaff hook having a trigger which may be easily set in operative position by simply grasping one of the levers and pushing downwardly on the handle, to spread the jaws and permit the trigger links to move to set aligned position.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a front elevation of the device in set position.

Figure 2 is a side elevation of the device.

Referring now to the drawing in which like characters of reference designate similar parts in the various views, 10 designates a frame bar 10 provided at its lower end with a longitudinally extending slot 11. A transverse handle 12 is secured to the upper end 13 of the frame bar 10 by a rivet 14 which passes through a pair of downwardly extending lugs 15 on the handle and through the upper end 13 of the bar 10.

A pair of crossed levers 16 and 17, in the form of compound curves, are pivotally connected together at their crossing by a pivot pin 20 which passes through the lower slot 21 of the frame bar 10. A pair of spreader links 22 and 23 are pivotally connected at their outer ends to the upper ends of the crossed levers by pivot pins 18 and 19. The spreader links are pivotally connected at their inner ends and to the frame bar 10 by a pivot pin 24 which passes through a slot 9 formed in the frame bar 10 near the upper end of the latter.

A pair of coil springs 25 are disposed on opposite sides of the frame bar 10 and are secured at the outer ends to the pivot pins 18 and 19. The pivot pins are provided with respective hooks 26 to receive a closed loop on the ends of the coil springs.

A pair of jaws 27 and 28, of right angular formation in side elevation, have two of their arms normally alined and pivotally connected together by a pivot pin 29 which passes through the slot 21 of the frame bar 10. The normally parallel arms of the jaws are pivotally connected to inturned ends 30 and 31 of the levers 16 and 17 by pivot pins 32 and 33. The parallel arms 36 and 37 of the jaws 27 and 28 are provided with teeth 38 on their confronting inner sides.

The trigger comprises a pair of normally alined links 39 and 40 which are connected at their outer ends to the normally parallel arms 27 and 28 of the jaws by pivot pins 41 and 42. The inner ends of the links are connected together by a pivot pin 43. The pivot pin 29 at the inner ends of the links permits the inner ends of the links to be dislodged upwardly under impact of a fish and thus trip the trigger so that the springs 25 may close the jaws 27 and 28 to impale a fish between them. The lower edges of the links 34 and 35 are provided with teeth 44.

Stop members 46 and 47 project from the same side of the inner ends of the links 39 and 40 at the pivot pin 43. These stop members abut each other when the jaws are in open position and prevent the links from moving beyond an alined position when the jaws are moved to open position and the springs 25 are placed under tension.

An inverted U-shaped yoke 45 is disposed astride of the pivoted upper ends of the spreader links 22 and 25 and receives the ends of the pivot pin 24 thereof. The yoke forms a good bearing for the pivot pin and receives the shock when the spreader links move the yoke to the upper end of the slot 9 when the trigger is tripped.

In operation to set the gaff hook with the jaws open the handle 12 is moved by one hand to the position shown in Figure 1 while the lever 16 is held stationary in the other hand of the operator. The spreader links 22 and 23 spread apart the upper ends of the crossed reversely curved levers 16 and 17 and the lower ends move inwardly toward each other to rock the upper ends of the jaws 27 and 28 inwardly on the pivot pins 32 and 33 with consequent rocking of the lower ends of the jaws outwardly to open parallel position.

While this movement is taking place the springs 25 are tensioned and at the same time the trigger is cocked by the links falling into alinement and being held in alinement by the stops 46 and 47 against the tension of the springs 25. To release the jaws in gaffing a fish the jaws are placed astride of the fish and the handle is lowered until the pivoted inner ends of the links 39 and 40 impinge against the fish and thus are dislodged upwardly to permit the spring 25 to immediately pull the upper ends of the crossed levers 18 and 17 close together with resultant spreading of the lower ends apart to swing the jaws on the pivot 43 and impale the fish between them.

From the above description it is thought that the construction and operation of the invention will be fully understood without further explanation.

What is claimed is:

A gaff hook comprising a frame bar provided at its lower end with a longitudinally extending slot, a transverse handle secured to the upper end of the frame bar, levers in the form of compound curves crossed between their ends on said frame bar, a pivot pin passed through the levers at their crossing and through said slot of the frame bar, spreader links pivotally connected to the frame bar near the upper end of the latter, a helical coil spring secured at the end to the spreader links, jaws of angular formation in side elevation pivoted to the lower ends of the said levers, said jaws having horizontal arms, a pivot pin connecting the horizontal arms together passing through said slot of the frame bar, said jaws having parallel arms provided with teeth on the inner sides, alined trigger links pivotally connected at their outer ends to the parallel arms of the jaws and pivotally connected together at their inner ends, the lower edges of the said links being provided with teeth, and stop members on the inner ends of the links abutting each other when the links are alined, said pivoted inner ends of the trigger links being adapted to be dislodged upwardly by impact with a fish to permit said spring to actuate said crossed levers to swing the jaws to impale the fish between them.

ARVO I. KOIVU.